(12) United States Patent
Fauber

(10) Patent No.: US 11,949,572 B2
(45) Date of Patent: Apr. 2, 2024

(54) COMPRESSION OF TELEMETRY SENSOR DATA WITH LINEAR MAPPINGS

(71) Applicant: Dell Products L.P., Round Rock, TX (US)

(72) Inventor: Ben Fauber, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 60 days.

(21) Appl. No.: 17/675,848

(22) Filed: Feb. 18, 2022

(65) Prior Publication Data

US 2023/0269145 A1    Aug. 24, 2023

(51) Int. Cl.
*H04L 43/04* (2022.01)
*H04L 69/04* (2022.01)

(52) U.S. Cl.
CPC .............. *H04L 43/04* (2013.01); *H04L 69/04* (2013.01)

(58) Field of Classification Search
None
See application file for complete search history.

(56) References Cited

U.S. PATENT DOCUMENTS

| | | | | |
|---|---|---|---|---|
| 7,296,132 B1 * | 11/2007 | Gross | ................. | G06F 11/3476 711/170 |
| 8,370,586 B2 * | 2/2013 | Whisnant | ................. | H03M 7/30 711/170 |
| 10,715,393 B1 * | 7/2020 | Madhavan | .............. | H04L 41/16 |
| 11,403,000 B1 | 8/2022 | Barker, Jr. | | |
| 11,416,298 B1 | 8/2022 | Barker, Jr. et al. | | |
| 2009/0067080 A1 | 3/2009 | Gross et al. | | |
| 2009/0106521 A1 | 4/2009 | Whisnant et al. | | |
| 2017/0351964 A1 * | 12/2017 | Gross | ................. | G06F 13/4282 |
| 2017/0359234 A1 * | 12/2017 | Gross | ................. | G06F 11/3476 |
| 2019/0149440 A1 | 5/2019 | Rantzau et al. | | |
| 2019/0243407 A1 | 8/2019 | Gross et al. | | |

(Continued)

FOREIGN PATENT DOCUMENTS

| | | | |
|---|---|---|---|
| CN | 114448598 A * | 5/2022 | |
| WO | WO-2007120965 A2 * | 10/2007 | .......... G06F 11/3003 |

OTHER PUBLICATIONS

Office Action dated Jun. 20, 2023 for U.S. Appl. No. 17/581,208, 35 pages.

(Continued)

*Primary Examiner* — Phyllis A Book
(74) *Attorney, Agent, or Firm* — Amin, Turocy & Watson, LLP

(57) ABSTRACT

A system can identify a group of time-series telemetry data that represents performance metrics of computing devices, wherein the group of time-series telemetry data is represented according to a first number of dimensions. The system can compress the group of time-series telemetry data, wherein the compressed group of time-series telemetry data is represented according to a second number of dimensions that is less than the first number of dimensions, wherein the compressed group of time-series telemetry data is homomorphic. The system can perform a data science operation on the compressed group of time-series telemetry data to produce a first result, wherein the first result is within a predetermined threshold value of a second result of performing the data science operation on the group of time-series telemetry data.

20 Claims, 15 Drawing Sheets

(56) References Cited

U.S. PATENT DOCUMENTS

| | | |
|---|---|---|
| 2019/0243799 A1 | 8/2019 | Gross et al. |
| 2019/0258677 A1 | 8/2019 | Beedgen et al. |
| 2019/0318251 A1 | 10/2019 | Gross et al. |
| 2019/0370085 A1 | 12/2019 | Gross et al. |
| 2020/0334540 A1 | 10/2020 | Borra et al. |
| 2021/0111974 A1* | 4/2021 | Tayeb ............... H04L 43/065 |
| 2021/0158106 A1 | 5/2021 | Vasseur et al. |
| 2022/0050598 A1* | 2/2022 | Kukla ............... H03M 7/3059 |
| 2022/0107847 A1* | 4/2022 | Shaffer ............... G06N 3/04 |
| 2022/0245485 A1 | 8/2022 | Cady |
| 2022/0413481 A1* | 12/2022 | Gawlick ............ G06F 11/3409 |

OTHER PUBLICATIONS

Fauber et al. "Time-Series Telemetry Data Compression" U.S. Appl. No. 17/581,208, filed Jan. 21, 2022, 50 pages.

Notice of Allowance dated Oct. 18, 2023 for U.S. Appl. No. 17/581,208, 33 pages.

Corrected Notice of Allowability dated Nov. 15, 2023 for U.S. Appl. No. 17/581,208, 21 pages.

* cited by examiner

| Downsampling Method | Number of Clusters | Homogeneity | Completeness | Validity Measure | Adjusted Rand Index |
|---|---|---|---|---|---|
| Full-Length | 18 | 1 | 1 | 1 | 1 |
| Our Method | 17 | 0.98 | 0.98 | 0.98 | 0.99 |
| Maxpooling | 1 | 0 | 1 | 0 | 0 |
| Minpooling | 1 | 0 | 1 | 0 | 0 |
| Meanpooling | 1 | 0 | 1 | 0 | 0 |
| Ordered Randomization | 1 | 0 | 1 | 0 | 0 |
| Complete Randomization | 1 | 0 | 1 | 0 | 0 |

FIG. 6

| Data Points | Compression Method | Fold Compression |
|---|---|---|
| 1.2 M | Sparse RP | 115 |
| 1.2 M | Very Sparse RP | 145 |
| 1.2 M | FJLT | 146 |
| 100 M | Sparse RP | 2,961 |
| 100 M | Very Sparse RP | 3,096 |
| 100 M | FJLT | 2,889 |

FIG. 7

| Method | Output File Format | Fold Compression |
|---|---|---|
| Vectorization | CSV | NA |
| Vectorization | NPY | 15 |
| Vectorization | NPZ | 143 |
| Sparse RP | CSV | 2,961 |
| Sparse RP | NPY | 22,341 |
| Sparse RP | NPZ | 19,830 |
| Very Sparse RP | CSV | 3,096 |
| Very Sparse RP | NPY | 22,341 |
| Very Sparse RP | NPZ | 24,684 |
| FJLT | CSV | 2,889 |
| FJLT | NPY | 22,341 |
| FJLT | NPZ | 17,738 |

| Data Points | Object Format | Fold Compression |
|---|---|---|
| 1.2 M | Pandas Dataframe | 1,109 |
| 1.2 M | NumPy Array | 4,656 |
| 1.2 M | CSR Array | 9,502,507 |
| 100 M | Pandas Dataframe | 30,825 |
| 100 M | NumPy Array | 129,498 |
| 100 M | CSR Array | 373,214,288 |

| OUTPUT FILE FORMAT | FOLD COMPRESSION |
|---|---|
| CSV | 150 |
| NPY | 846 |
| NPZ | 1,228 |

COMPRESSION OF TELEMETRY SENSOR DATA WITH LINEAR MAPPINGS

BACKGROUND

Data compression can comprise an encoding of data where a compressed version of the data can be expressed with fewer bytes than an uncompressed version of the data.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can identify a group of time-series telemetry data that represents performance metrics of computing devices, wherein the group of time-series telemetry data is represented according to a first number of dimensions, The system can compress the group of time-series telemetry data to produce a compressed group of time-series telemetry data, wherein the compressed group of time-series telemetry data is represented according to a second number of dimensions that is less than the first number of dimensions, wherein the compressed group of time-series telemetry data is homomorphic relative to the group of time-series telemetry data, and wherein a first data size of the compressed group of time-series telemetry data is smaller than a second data size of the group of time-series telemetry data, The system can perform a data science operation on the compressed group of time-series telemetry data to produce a first result, wherein the first result is within a predetermined threshold value of a second result of performing the data science operation on the group of time-series telemetry data.

A method can comprise identifying, by a system comprising a processor, a group of time-series telemetry data that represents performance metrics of computing devices. The method can further comprise compressing, by the system, the group of time-series telemetry data to produce a compressed group of time-series telemetry data, wherein the compressed group of time-series telemetry data is of a second number of dimensions that is less than a first number of dimensions of the group of time-series telemetry data, and wherein the compressed group of time-series telemetry data is homomorphic relative to the group of time-series telemetry data. The method can further comprise performing, by the system, a data science operation on the compressed group of time-series telemetry data to produce a first result, wherein the first result is within a predetermined threshold value of a second result of performing the data science operation on the group of time-series telemetry data.

An example non-transitory computer-readable medium can comprise instructions that, in response to execution, cause a system comprising a processor to perform operations. These operations can comprise compressing a group of time-series telemetry data, the compressing resulting in a compressed group of time-series telemetry data, wherein the group of time-series telemetry data represents performance metrics of computing devices, wherein the compressed group of time-series telemetry data has a second number of dimensions that is less than a first number of dimensions of the group of time-series telemetry data, and wherein the compressed group of time-series telemetry data is homomorphic relative to the group of time-series telemetry data. These operations can further comprise performing a data science operation on the compressed group of time-series telemetry data to produce a first result, wherein the first result is within a predetermined threshold value of a second result of performing the data science operation on the group of time-series telemetry data.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 6 illustrates an example table showing a comparison of clustering results of an original full-length d-dimensional compared to 256-dimensional tensors created according to the present techniques as well as other techniques, which can facilitate time-series telemetry data compression according to aligned time series tensors, in accordance with an embodiment of this disclosure;

FIG. 7 illustrates an example table showing fold-compression achieved by 256-dimensional tensors created according to the present techniques using various Johnson-Lindenstrauss theorem techniques to achieve data compression, which can facilitate time-series telemetry data compression according to aligned time series tensors, in accordance with an embodiment of this disclosure;

FIG. 8 illustrates an example table showing fold-compression achieved by 256-dimensional tensors created according to the present techniques on a 100 million row univariate telemetry sensor data set versus raw tabular telemetry data, which can facilitate time-series telemetry data compression according to aligned time series tensors, in accordance with an embodiment of this disclosure;

FIG. 9 illustrates an example table showing fold-compression achieved by 256-dimensional tensors created with a fast Johnson-Lindenstrauss theorem on univariate telemetry sensor data set versus raw telemetry data in memory, which can facilitate time-series telemetry data compression according to aligned time series tensors, in accordance with an embodiment of this disclosure;

FIG. 10 illustrates an example table showing fold-compression achieved by 256-dimensional tensors created with a fast Johnson-Lindenstrauss theorem on a 5 sensor×1 million rows per sensor multivariate telemetry data set versus raw tabular telemetry data, which can facilitate time-series telemetry data compression according to aligned time series tensors, in accordance with an embodiment of this disclosure;

DETAILED DESCRIPTION

Overview

Figure 1:
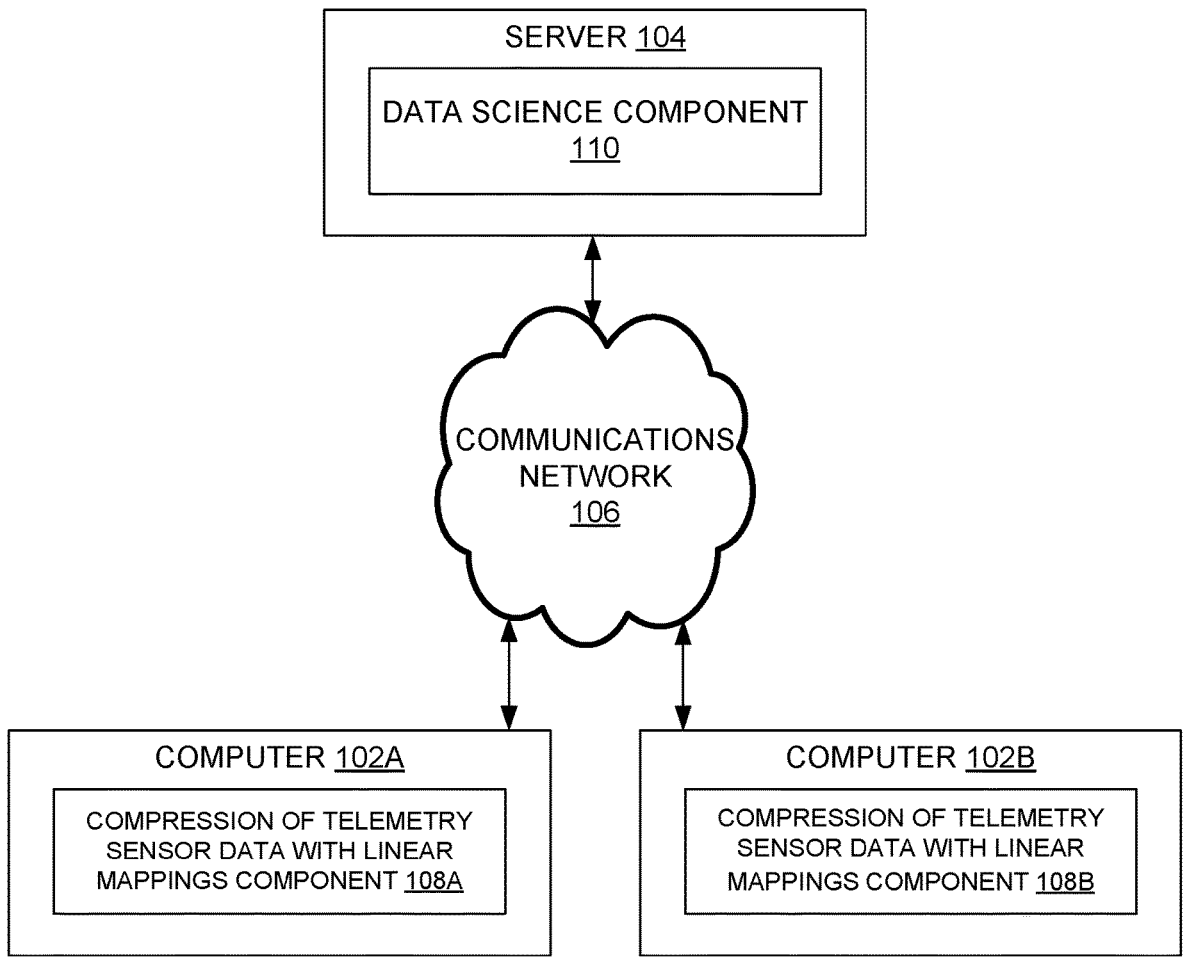
FIG. 1 illustrates an example system architecture that can facilitate compression of telemetry sensor data with linear mappings, in accordance with an embodiment of this disclosure.

Telemetry can comprise an in situ collection of measurements and their transmission to remote receiving equipment for monitoring. The present techniques can be implemented to improve data sampling and compression for hardware telemetry. These techniques can be implemented to project tabular telemetry data into aligned tensors (wherein a tensor can generally comprise an array of values) to generate vectorized representations of univariate and multivariate time series data. The tensors can then be subjected to various Johnson-Lindenstrauss transforms to achieve a lower dimension representations of the tensors. This can result in compression of the data while preserving the characteristics of the time series. Data compressed according to the present techniques can be used as-is in data science applications. In some examples, data compressed according to the present techniques can achieve a more than 20,000-fold compression of the data versus the raw telemetry sensor data set.

Data compression can comprise an area of study within a broader field of information theory. Data compression can apply various techniques to reduce a size of data without loss of relevant information. Classically, there can be two main types of data compression: 1) lossless compression and 2) lossy compression. Lossless compression can allow the data to be compressed, and then decompressed for restoration into its exact original form. Lossy compression can permanently discard some data to achieve the compression. Thus, it can be that lossy compression techniques do not allow for the full recovery or reconstruction of the data into its exact original form. As a result, it can be that much higher compression ratios can be achieved with lossy techniques than are possible when applying lossless compression.

Lossy compression methods can generally be applied to data-rich content, such as images and audio. A technique within lossy compression methods can be transform coding. Transform coding can transform the input into a different form that can either: 1) allow for further compression, or 2) drop certain data while limiting the qualitative loss of the output. Examples of transform coding include a Joint Photographic Experts Group, (JPEG) approach for compressing images, and a Moving Pictures Experts Group (MPEG) approach for compressing audio (e.g. MPEG Layer III, or MP3).

Telemetry can comprise an in situ collection of measurements and their automatic transmission, generally via telecommunication, to remote receiving equipment for monitoring. Telemetry generally has origins in the remote monitoring of machinery, and rose to prominence through wartime necessity and space exploration. Some computer and server manufacturers have more recently enabled telemetry for their hardware, with a goal of improving their customer experience by proactively addressing fatigued or unstable devices.

Hardware telemetry systems can typically collect information from the devices such as battery status, basic input output system (BIOS) data, device configuration, disk and memory data, driver crashes, processor status, operating system, and thermal status. Collectively, this information can be used to train machine learning models to identify early warning signs of potential hardware failure, thereby offering an opportunity to intervene and rescue the device from failure.

The present techniques can be implemented to improve data compression and sampling algorithms for hardware telemetry. Some prior hardware telemetry approaches can deliver diagnostic information at a frequency of up to one measurement per second. As a result of this rapid sampling rate, the data set for one sensor can result in over 2.5 million data points per month. With a conservative estimate of 100 sensors per device, this would result in 250 million data points per month, per device. Extrapolating this result to approximately 100 million active and entitled devices in the field could result in approximately $2.5 \times 10^{16}$ data points per month. Not only is this a lot of data to transmit from the hardware to remote receiving equipment for monitoring, but can also be a lot of data to navigate and potentially store. As such, there can be a need for improved data compression and sampling techniques for hardware telemetry data.

Figure 2:
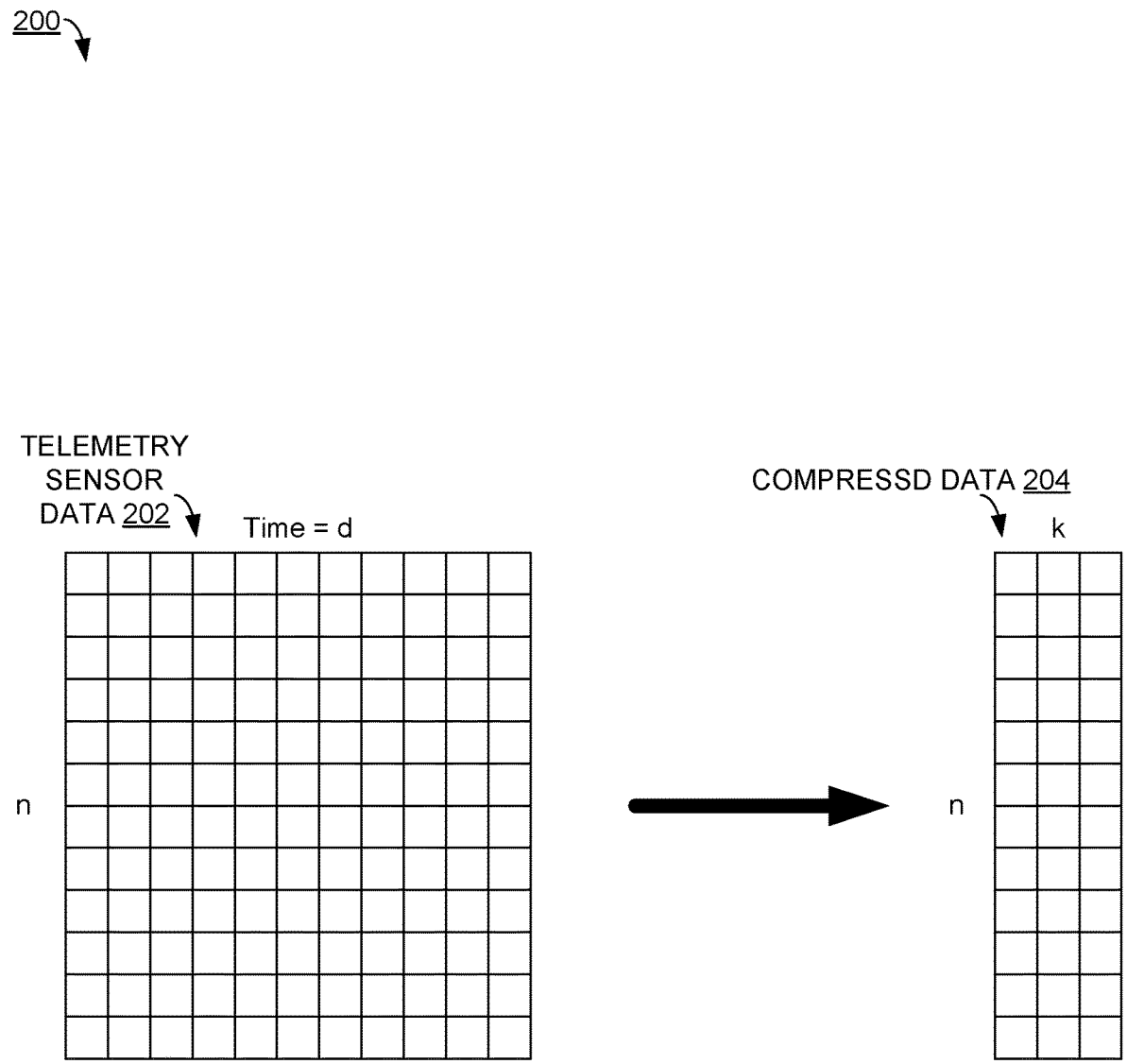
FIG. 2 illustrates an example compression of telemetry sensor data with linear mappings, in accordance with an embodiment of this disclosure.

The present techniques can be implemented to apply a Johnson-Lindenstrauss transform (JLT) linear mapping to aligned vectorized time series telemetry data (such as illustrated in FIG. 2). Application of a JLT can reduce a dimensionality of telemetry data by ≥99% while preserving the pair-wise distances between the telemetry data tensors. Further, lower-dimensional tensors, when used in machine learning techniques, can provide comparable results with the full-length tensors and improved results over randomly downsampled tensors of similar low-dimensionality. Results can be further categorized as homomorphic encryption of the telemetry data.

Example Architecture

FIG. 1 illustrates an example system architecture 100 that can facilitate compression of telemetry sensor data with linear mappings, in accordance with an embodiment of this disclosure. System architecture 100 comprises computer 102A, computer 102B, server 104, and communications network 106. In turn, computer 102A comprises compression of telemetry sensor data with linear mappings component 108A; computer 102B comprises compression of telemetry sensor data with linear mappings component 108B; and server 106 comprises data science component 110.

Figure 15:
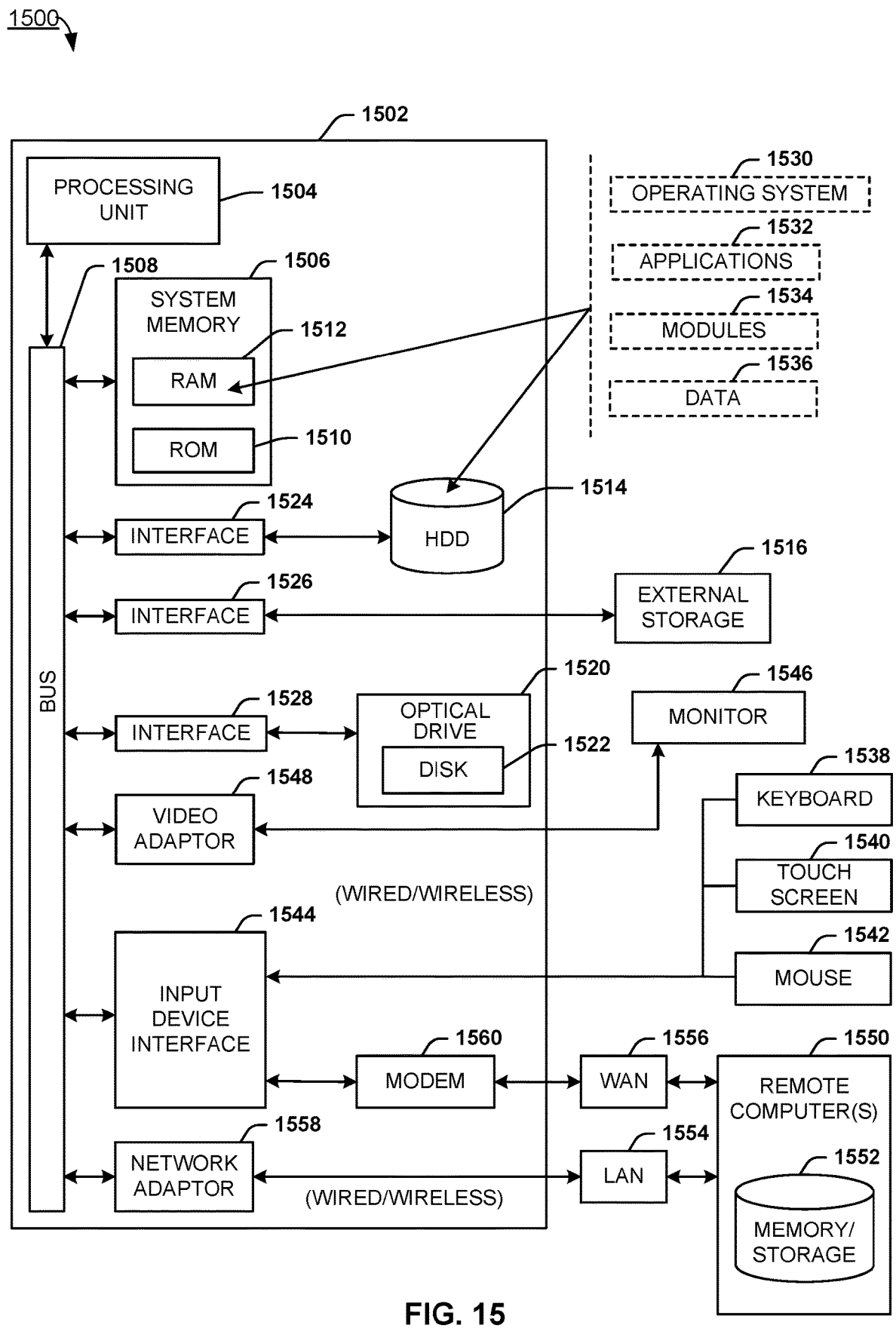
FIG. 15 illustrates an example block diagram of a computer operable to execute an embodiment of this disclosure.

Each of computer 102A, computer 102B, and server 104 can be implemented with part(s) of computing environment 1500 of FIG. 15. Communications network 106 can comprise a computer communications network, such as the Internet.

Figure 12:
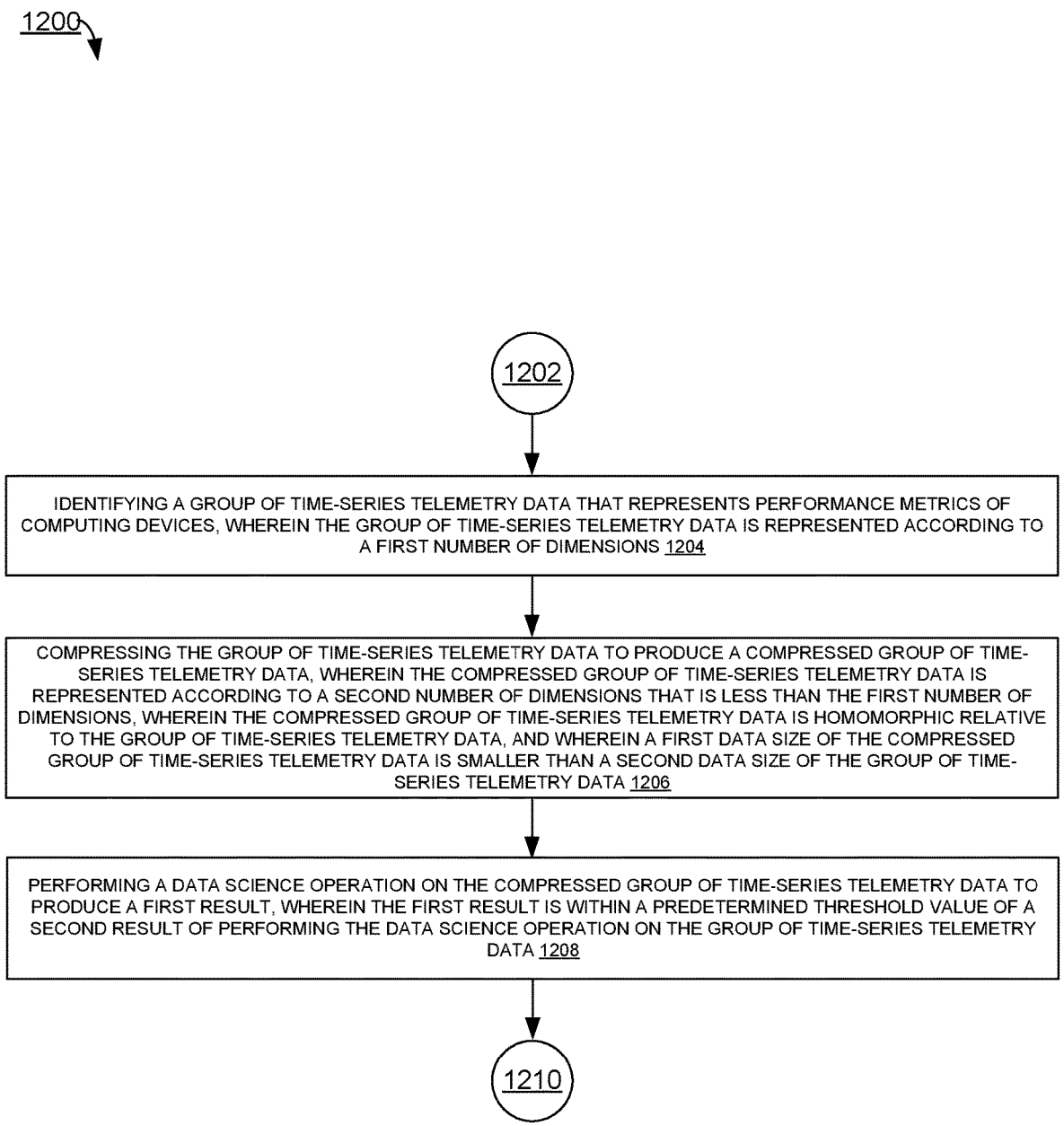
FIG. 12 illustrates an example process flow for compression of telemetry sensor data with linear mappings, in accordance with an embodiment of this disclosure.
Figure 13:
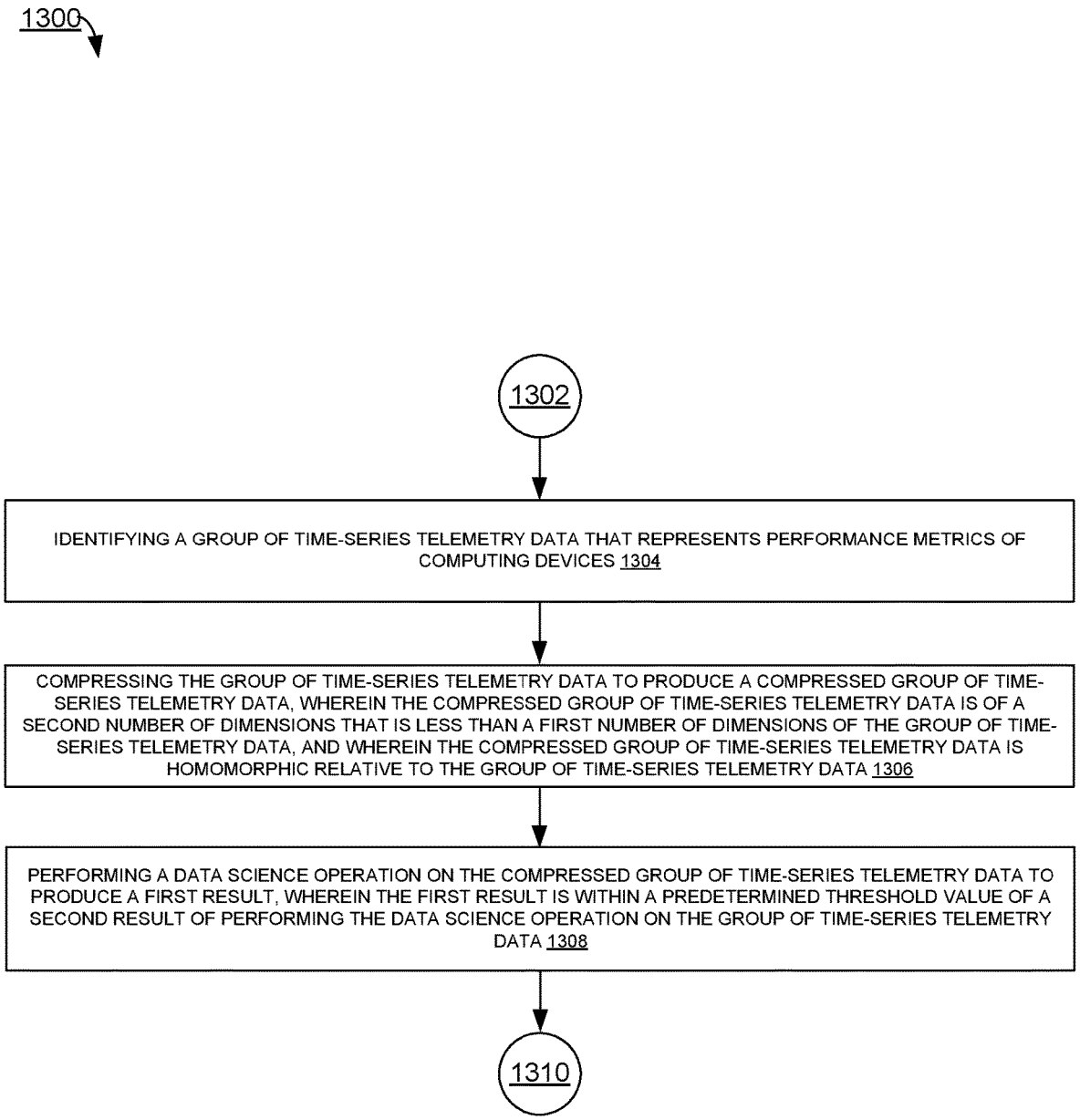
FIG. 13 illustrates another example process flow for compression of telemetry sensor data with linear mappings, in accordance with an embodiment of this disclosure.
Figure 14:
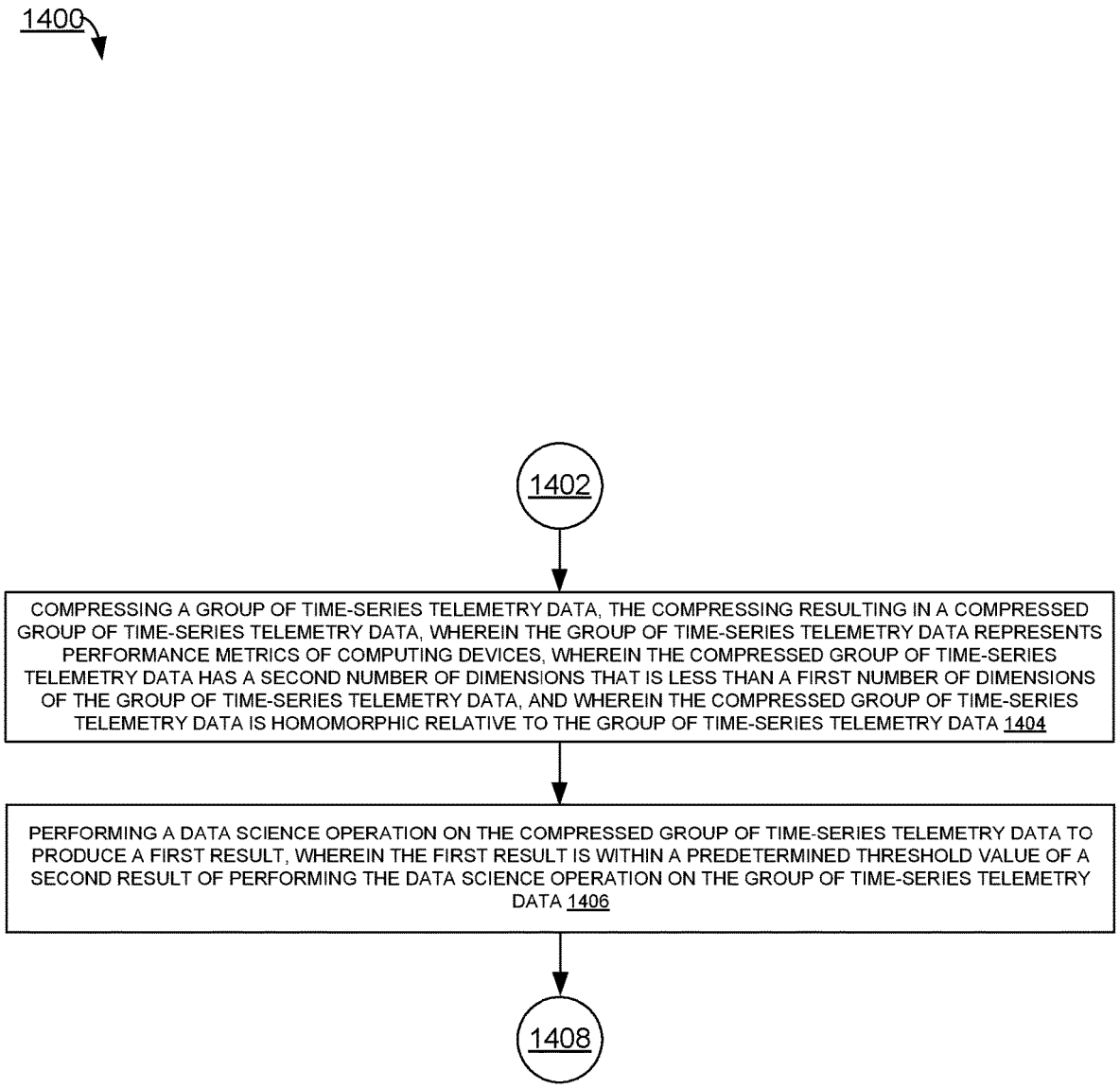
FIG. 14 illustrates another example process flow for compression of telemetry sensor data with linear mappings, in accordance with an embodiment of this disclosure.

In some examples, each of compression of telemetry sensor data with linear mappings component 108A, compression of telemetry sensor data with linear mappings component 108B, and data science component 110 can implement part(s) of the process flows of FIGS. 12-14 to facilitate compression of telemetry sensor data with linear mappings.

Computer 102A and computer 102B can each generate time-series telemetry data about their operation (e.g., processor utilization or memory utilization). This time-series telemetry data can be compressed by compression of telemetry sensor data with linear mappings component 108A, or compression of telemetry sensor data with linear mappings component 108B, respectively, and transmitted to server 104 via communications network 106. This compression can comprise a homomorphic compression.

Server 104 can receive this compressed time-series telemetry data, and use data science component 110 to process this data, such as by using it to determine whether each of computer 102A and computer 102B are operating correctly. Data science component 110 can perform data science operations on the homomorphically compressed data. A result of operating on the homomorphically compressed data can be valid for data science purposes because it is close to, or the same as, a result obtained from performing an equivalent data science operation on the uncompressed data.

It can be appreciated that system architecture 100 is one example system architecture for time-series telemetry data compression, and that there can be other system architectures that facilitate time-series telemetry data compression.

Example Compressions

FIG. 2 illustrates an example compression 200 of telemetry sensor data with linear mappings, in accordance with an embodiment of this disclosure. In some examples, compression 200 can be implemented by compression of telemetry sensor data with linear mappings component 108A of FIG. 1 or compression of telemetry sensor data with linear mappings component 108B to facilitate compression of telemetry sensor data with linear mappings.

Compression 200 comprises telemetry sensor data 202 and compressed data 204. Telemetry sensor data is raw data, such as that generated by computer 102A of FIG. 1 about its performance metrics. Compressed data 204 is a corresponding compressed version of telemetry sensor data 202.

The present techniques can be implemented to transform irregular tabular telemetry sensor data into aligned tensors (202), then use $l_2$-norm preserving JLTs to compress the data into lower dimensions while retaining key characteristics of univariate (n=1) and multivariate (n>1) time series data (204). In this example, the telemetry sensor data is compressed by more than 20,000-fold versus the raw data and directly usable in data science applications.

Example Graphs and Tables

Figure 3:
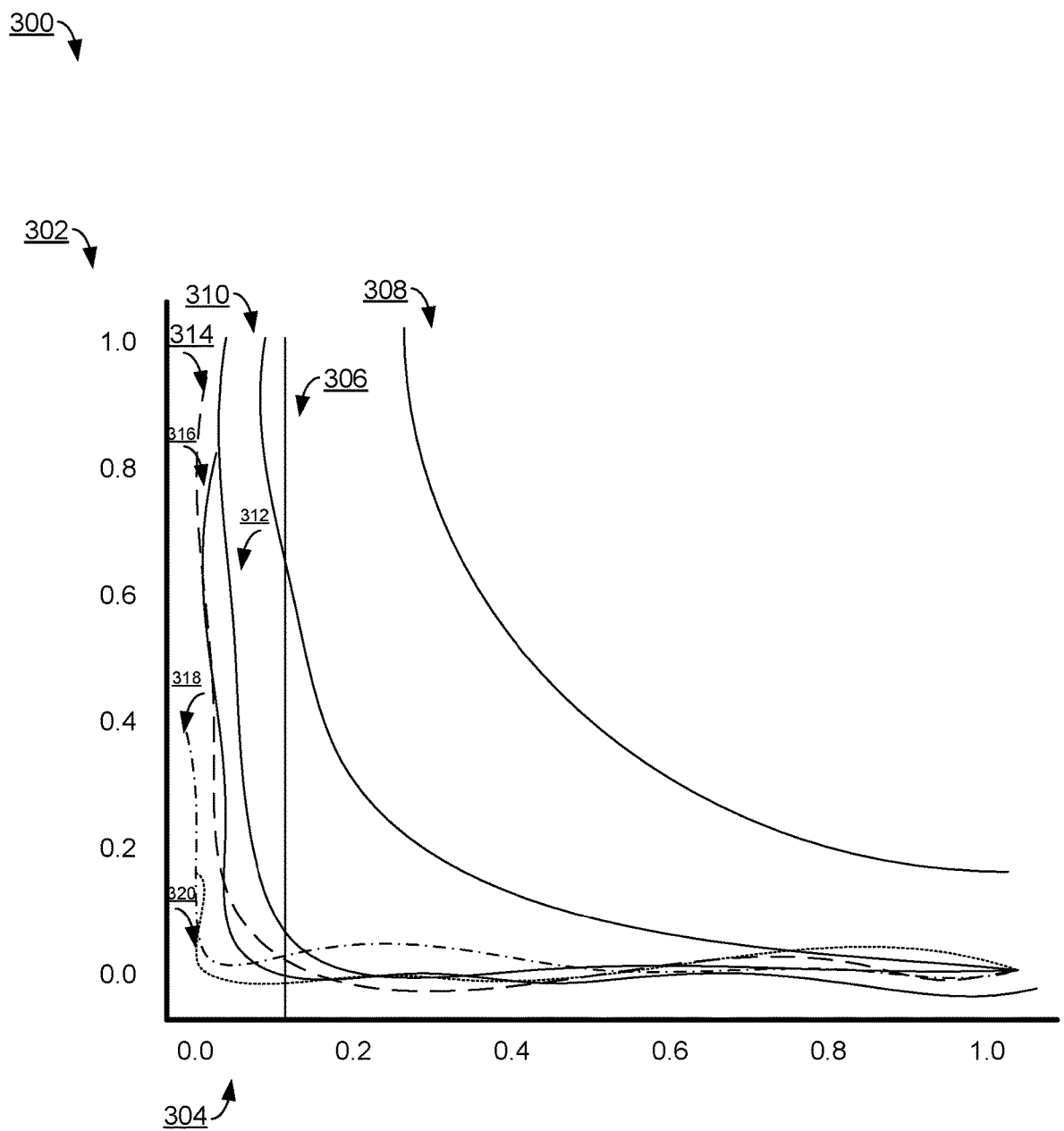
FIG. 3 illustrates an example graph of F to k-dimensions/d-dimensions that can facilitate time-series telemetry data compression according to aligned time series tensors, in accordance with an embodiment of this disclosure.

FIG. 3 illustrates an example graph 300 of F to k-dimensions/d-dimensions that can facilitate time-series telemetry data compression according to aligned time series tensors, in accordance with an embodiment of this disclosure. In some examples, information from graph 300 can be used by compression of telemetry sensor data with linear mappings component 108A of FIG. 1 or compression of telemetry sensor data with linear mappings component 108B to facilitate compression of telemetry sensor data with linear mappings.

Graph 300 plots guarantees for a Johnson-Lindenstrauss transform of various d-to-k dimensions 302 versus an ε value 304. In some examples, lower ε values and k-dimensions/d-dimensions ratios can be preferred (that is, those in the bottom left area of graph 300) for dimensionality reduction with optimal preservation of pair-wise distances. The value of ε=0.1 at line 306 is shown for reference.

Plotted on graph 300 are plot 308 (corresponding to $10^3$ d dimensions), plot 310 (corresponding to $10^4$ d dimensions), plot 312 (corresponding to $10^5$ d dimensions), plot 314 (corresponding to $10^6$ d dimensions), plot 316 (corresponding to $10^7$ d dimensions), plot 318 (corresponding to $10^8$ d dimensions), and plot 320 (corresponding to $10^9$ d dimensions).

Dimensionality reduction can comprise a technique applied in data science to map high-dimensional data onto a lower-dimensional space while preserving as much information as possible. The Johnson-Lindenstrauss lemma can prove the existence of a class of linear mappings (that is, homomorphisms) that provide low-distortion embeddings of an arbitrary number of points from high-dimensional Euclidean space into an arbitrarily lower dimensional space. A Johnson-Lindenstrauss transform (JLT) Φ can comprise a random linear map for any set Z of n-points in d-dimensions, defined by a matrix $A \in \mathbb{R}^{k \times d}$ where $\varepsilon \in (0, 1]$ and the pair-wise Euclidean distance between points u and v, $\forall (u, v) \in Z$, is defined by the following equation:

$$(1-\varepsilon)\|u-v\|_{\ell_2}^2 \leq \|Au-Av\|_{\ell_2}^2 \leq (1+\varepsilon)\|u-v\|_{\ell_2}^2 \qquad (2)$$

This equation can be further simplified to the next equation, where A is replaced with the linear map Φ and x=u−v.

$$\|\Phi x\|_{\ell_2}^2 = (1\pm\varepsilon)\|x\|_{\ell_2}^2 \forall x \in Z \qquad (3)$$

Further, with respect to the sampling of Φ, there can be a high probability that the transformed points have at most $(1\pm\varepsilon)$ multiplicative distortion with no dependence on Z, as defined by the following equation:

$$Pr\left[\|\Phi x\|_{\ell_2}^2 = (1 \pm \varepsilon)\|x\|_{\ell_2}^2\right] \leq 1 - \frac{1}{n^3} \qquad (4)$$

The random normal probability density function can be defined by the following equation, where p is the mean and $\sigma^2$ is the variance of the distribution:

$$N(\mu, \sigma^2, x) = \left(\frac{1}{2\pi\sigma^2}\right) e^{\frac{-(x-\mu)^2}{2\sigma^2}} \qquad (5)$$

The Gaussian testing matrix of $\Phi \in \mathbb{R}^{k \times d}$ can be i.i.d. such that $$\varphi \sim N\left(0, \frac{1}{k}\right),$$

where k can be as small as $$k \approx \Omega\left(\frac{\log(n)}{e^2}\right).$$

Further, the value of k can be independent of d when d≤n.

Application of JLT to tensors of d-dimensions can reveal a power-law relationship with k over ε∈(0, 1], as shown in graph 300. Lower ε values can be preferred for optimal preservation of pair-wise distances. Minimizing the ratio of k-dimensions to d-dimensions can be implemented to maximize the dimensionality reduction. As noted in graph 300, d-dimensions of more than 10,000 can achieve reasonable dimensionality reduction with favorable F theoretical guarantees from JLT.

Figure 4:
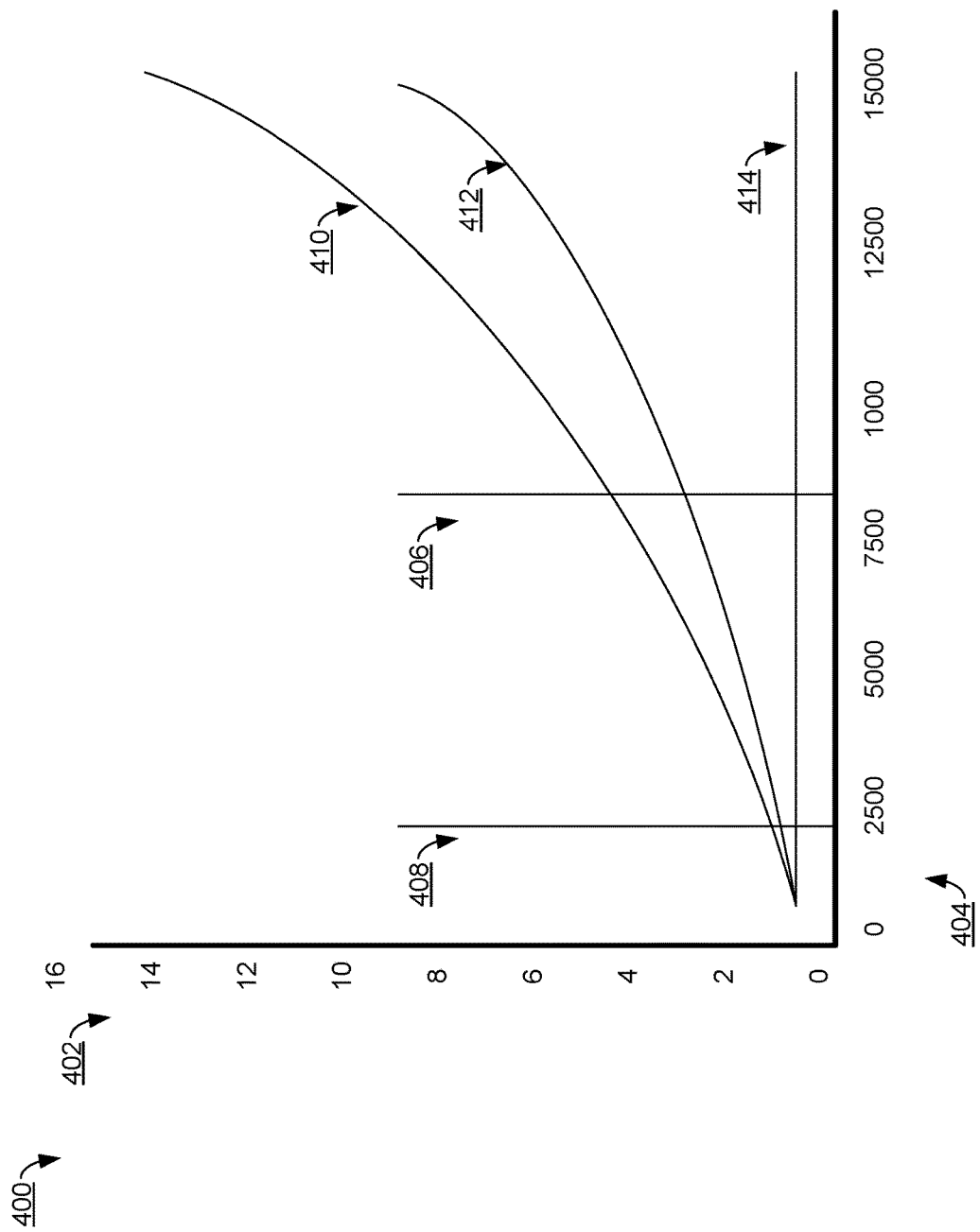
FIG. 4 illustrates an example graph of computational wall times of d-to-k dimensionality reductions over various k values that can facilitate time-series telemetry data compression according to aligned time series tensors, in accordance with an embodiment of this disclosure.

FIG. 4 illustrates an example graph 400 of computational wall times of d-to-k dimensionality reductions over various k values that can facilitate time-series telemetry data compression according to aligned time series tensors, in accordance with an embodiment of this disclosure. In some examples, information from graph 400 can be used by compression of telemetry sensor data with linear mappings component 108A of FIG. 1 or compression of telemetry sensor data with linear mappings component 108B to facilitate compression of telemetry sensor data with linear mappings.

Graph 400 plots computational wall times (sec) 402 of d-to-k dimensionality reductions (d=16,384) over various k values 404 for the Sparse Random Projection, Very Sparse Random Projection, and FJLT approaches. The ε={0.1, 0.2} values are shown for reference, with line 406 and line 408, respectively.

Sparse Random Projection, Very Sparse Random Projection, and FJLT approaches are indicated with plot 410, plot 412, and plot 414, respectively.

The term random projections can be used to describe the JLT, and be synonymous with the process of approximate metric preserving dimension reduction using randomized linear mappings (x ↦ Φx). However, in some examples, these linear mappings need not be projections in the linear algebraic sense of the word.

The JLT can be a powerful result, yet the algorithm's inherent $O(n^2d)$ time complexity can limit its applicability, especially for large arrays. As a result, JLT time complexity can be improved upon. A random normal distribution of the JLT can be replaced with sparse representations. Specifically, a Gaussian $$N\left(0, \frac{1}{k}\right)$$

testing matrix of Φ can be replaced with the sparse entries {−1, 0, 1}, and respective probabilities of {⅙, ⅔, ⅙}, to achieve a sparse mapping and a 3-fold speedup in processing time. This process can be referred to as a Sparse Random Projection.

A further improvement can demonstrate that replacing the Gaussian testing matrix of Φ with the entries {−1, 0, 1}, and $$\left\{\frac{1}{2\sqrt{d}}, 1-\frac{1}{\sqrt{d}}, \frac{1}{2\sqrt{d}}\right\}$$

can achieve a very sparse mapping with a $\sqrt{d}$-fold speedup in processing time. This approach can lead to an improved overall time complexity of $O(ndk+n^2k)$ in comparison to the $O(n^2d)$ JLT. This process can be known as a Very Sparse Random Projection.

Another improvement in a time complexity of JLT can result from sparse mapping observations of, merged with the use of a discrete Fourier transform to achieve dense arrays and distance preservation. The combination of these features can be described as the Fast JLT (FJLT) due to its $O(d \log(d)+k)$ time complexity (Equation 6), and improvement over the $O(n^2d)$ JLT and very sparse random projection method in graph 400.

$$\Phi = \sqrt{\frac{\xi}{d \times k}} P \mathcal{H} D \tag{6}$$

The ξ term in the normalizing scalar of the FJLT can be defined by the following equation, where ξ and ρ are positive real integers:

$$\xi = 2^\rho, \text{ s.t. } \underset{\rho}{\text{argmin}}\left(1 \geq \left|\frac{d}{2^\rho}\right|\right) \tag{7}$$

The FJLT can utilize a sparse matrix $P \in \mathbb{R}^{k \times d}$, where Pij=bijrij. The sparsity in P can be induced by the product of a Bernoulli distribution bij~Bernoulli(q), where q is defined according to the following equation, p∈{1, 2} is the desired norm of the embedding (e.g., $\ell_2^d \to \ell_p^k$), and rij is a random draw from the normal distribution $$\mathcal{N}\left(0, \frac{1}{q}\right):$$

$$q = \min\left\{\Theta\left(\frac{\varepsilon^{p-2}\log^p n}{d}\right), 1\right\} \tag{8}$$

The sparsity of P can significantly improve the time complexity when calculating products of P. However, under these conditions, it can be that the Johnson-Lindenstrauss lemma would not hold if P is multiplied by another sparse matrix, thus leading to a sparse product and diminished distance preservation. To improve the FJLT error bounds and minimize this risk, the input data Z can be preprocessed with a randomized Fourier transform (e.g. Walsh-Hadamard matrix H) to ensure non-sparsity (Equation 6). The additional randomization of the transform with a diagonal sign matrix D can further prevent the mapping of dense arrays to sparse arrays and preserves the optimality of the JLT.

The Walsh-Hadamard matrix $\mathcal{H} \in \mathbb{R}^{d \times d}$ can serve as a unitary discrete Fourier transform of dimension d, where $H_{ij}=d^{-1/2}(-1)^{\langle i-1, j-1 \rangle}$ and $\langle i, j \rangle$ is the bit-wise inner product of the binary representations of i and j. The Fast Walsh-Hadamard transform (FWHT) can utilize a divide-and-conquer approach to rapidly calculate the Walsh-Hadamard matrix product with $O(d \log d)$ time complexity, and can be implemented in a FJLT according to the present techniques.

The diagonal sign matrix D of the FJLT can be defined as $D \in \mathbb{R}^{d \times d}$ diagonal matrix. The Dii values can be independent Rademacher random variables {−1, 1}.

Figure 5:
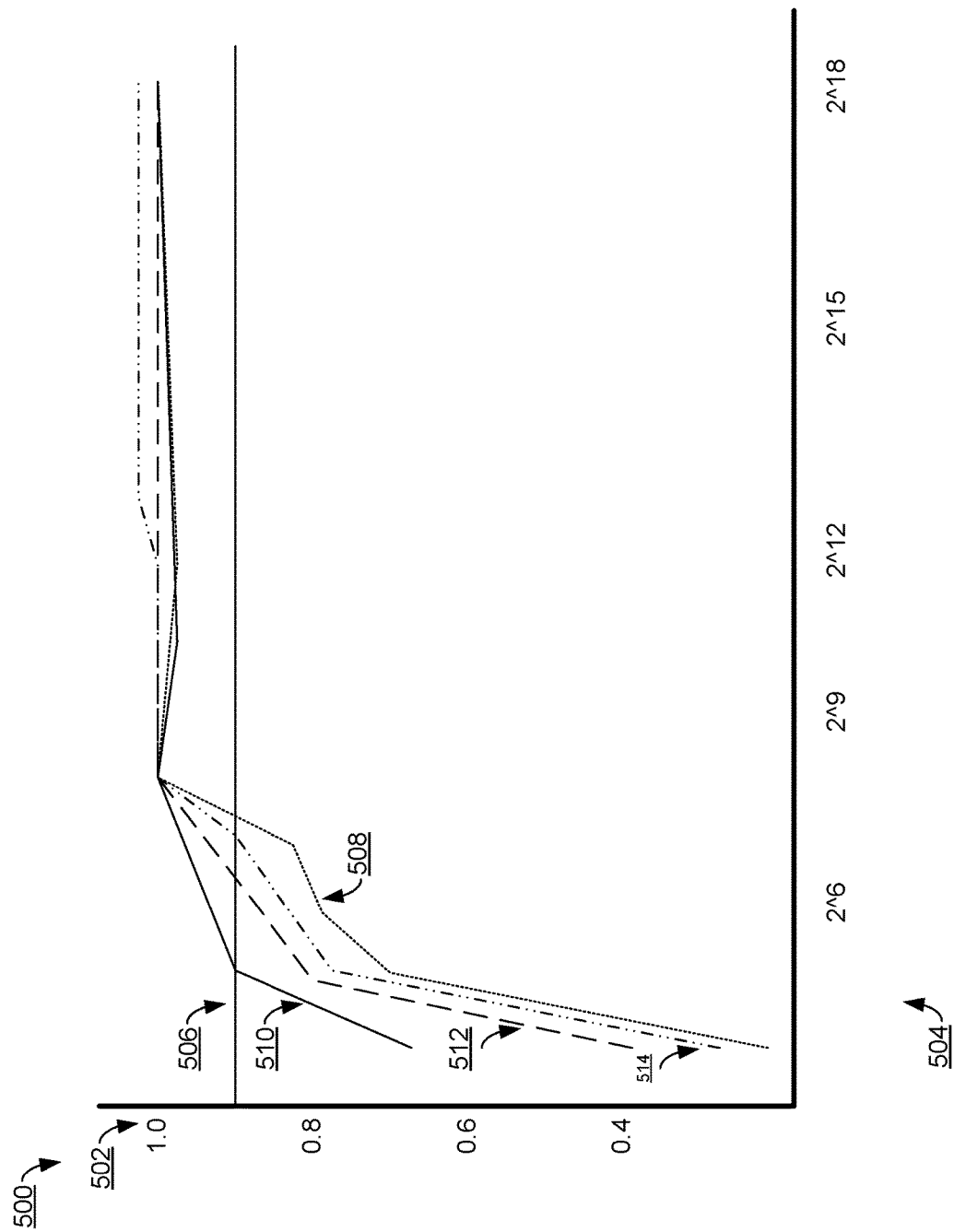
FIG. 5 illustrates an example plot of k-dimensions of the data versus clustering scores of various clustering metrics, which can facilitate time-series telemetry data compression according to aligned time series tensors, in accordance with an embodiment of this disclosure.

FIG. 5 illustrates an example plot of k-dimensions of the data versus clustering scores of various clustering metrics, which can facilitate time-series telemetry data compression according to aligned time series tensors, in accordance with an embodiment of this disclosure. In some examples, information from graph 500 can be used by compression of telemetry sensor data with linear mappings component 108A of FIG. 1 or compression of telemetry sensor data with linear mappings component 108B to facilitate compression of telemetry sensor data with linear mappings.

Graph 500 plots k-dimensions 504 of the data versus the clustering scores 502 of various clustering metrics from the application of the present techniques and DBSCAN clustering of the resulting tensors. The 90% clustering metric value threshold is shown for reference (506). In this example, a 90% clustering metric value threshold is exceeded for all clustering metrics when k≥256 (that is, 28).

Plotted are homogeneity 508, completeness 510, validity measure 512, and adjusted Rand index 514.

The linear mappings of the JLT can be part of a subfield of abstract algebra known as homomorphisms. Algebra homomorphisms can also be the basis of homomorphic encryption, where the result of the homomorphic computation can be an encrypted form of the data. Homomorphic encryption can permit users to perform computations on the encrypted data without first decrypting it, while achieving either the same, or nearly the same, outcome as the computation on the unencrypted data. Homomorphic encryption can have advantageous applications in privacy-preserving data transmission, storage, and computation.

$$\Phi(\psi+\xi)=\Phi\psi+\Phi\xi \quad (9)$$

$$\Phi(\psi\cdot\xi)=\Phi\psi\cdot\Phi\xi \quad (10)$$

Mathematical operations performed on homomorphically encrypted data that yield identical results to the same mathematical operations performed on the raw data can be referred to as fully homomorphic. Mathematical operations performed on homomorphically encrypted data that yield nearly identical results to the same mathematical operations performed on the raw data can be referred to as partially homomorphic. Homomorphisms can be additive and/or multiplicative, and these concepts are illustrated in Equations 9 and 10, respectively, where $(\psi, \xi) \in \mathbb{R}^{n \times m}$, $\psi \mapsto \Phi\varphi$, and $\xi \mapsto \Phi\xi$.

FIG. 6 illustrates an example table 600 showing a comparison of clustering results of an original full-length d-dimensional compared to 256-dimensional tensors created according to the present techniques as well as other techniques, which can facilitate time-series telemetry data compression according to aligned time series tensors, in accordance with an embodiment of this disclosure. In some examples, information from table 600 can be used by compression of telemetry sensor data with linear mappings component 108A of FIG. 1 or compression of telemetry sensor data with linear mappings component 108B to facilitate compression of telemetry sensor data with linear mappings.

Table 600 comprises a comparison of DBSCAN clustering results and metrics of the original full-length d-dimensional tensor versus the 256-dimensional tensors achieved by the present techniques and various other techniques. For all clustering metrics, scores of 1 indicate identical cluster composition to ground-truth. The clusters created from the full-length telemetry data set are used as the ground-truth. Rows 602 indicate various techniques, and columns 604 indicate corresponding results.

The quality of the DBSCAN clustering results can be evaluated using a variety of clustering metrics including Homogeneity, Completeness, Validity Measure, and Adjusted Rand Index. Homogeneity can comprise a metric of a cluster labeling given a ground truth. A clustering result can satisfy Homogeneity where all its clusters contain only data points which are members of a single class. A result can satisfy Completeness where all the data points that are members of a given class are elements of the same cluster. Validity Measure can comprise a harmonic mean between homogeneity and completeness. Adjusted Rand Index can comprise a similarity between two data clustering results adjusted for the chance grouping of elements. Adjusted Rand Index can be related to an "accuracy" metric that is sometimes applied in supervised learning classification problems. For clustering metrics, scores of 1 can indicate identical cluster composition to ground-truth. The clusters created from the original full-size (that is, d-dimensional) telemetry data set can be treated as the ground-truth for clustering metric assessment purposes.

The outcome of this analysis can demonstrate that the telemetry data processed according to the present techniques can result in nearly identical clustering outcomes as the raw telemetry data for k≥256 (such as in graph 500 of FIG. 5). Further, the present techniques can provide superior results to other downsampling methods such as applying a maxpooling, minpooling or meanpooling convolutions to a full-length tensor to achieve a 256-dimensional tensor from the original full-length d-dimensional tensor (d=377, 379). In some examples, randomly selecting values for each convolution (that is, ordered randomization), nor randomly selecting values from the original full-length tensor (that is, complete randomization), does not result in reasonable results as compared to the ground-truth as shown in table 600. These findings can further demonstrate the superiority of the present techniques to other downsampling methods.

In an example, a computing cluster, comprising more than 300 servers, provides telemetry sensor data. The data can be collected via an integrated remote access controller over the span of multiple hours or days, at a collection frequency of every 5 seconds. The telemetry sensor time series data can be un-aligned. As such, $t_n$ were not the same $\forall_s \in S$ nor $\forall_m \in M$ yet the data was collected at the same $\tau$. Multiple sensor attributes can be collected for each server in the cluster. These sensor attributes an include features such as CPU utilization, motherboard temperature, and fan speed.

100,000,000 rows of telemetry sensor data can be selected for a single sensor attribute. This can amount to approximately 21 days of data. The present techniques can be applied to the univariate telemetry sensor data to demonstrate that the present techniques reduce the tabular time series data into aligned tensors for s∈M, where |M|=331 and s=CPU utilization. A FJLT approach according to the present techniques can be applied over $2^\rho$ different k-dimensions s.t. k≤ξ, where ξ and max(ρ) are defined by Equation 7, k∈ $\{2^\rho, \ldots, \xi\}$, and ρ={1, ..., max(ρ)}. The length of the set of ρ values can be defined as Ξ=|ρ|. This can lead to $\Xi \in \mathbb{R}^k$ representations of the vectorized univariate telemetry sensor data for each m∈M.

To assess the ability of the present techniques to facilitate data science applications on the lower-dimensional and compressed data, the $\Xi \in \mathbb{R}^k$ representations can be used in a data science clustering analysis. A Density-Based Scanning (DBSCAN) clustering algorithm can be independently applied to each k-dimensional telemetry sensor data set created with the present techniques, as well as the original full-size (i.e. d-dimensional) telemetry data set.

FIG. 7 illustrates an example table 700 showing fold-compression achieved by 256-dimensional tensors created according to the present techniques using various Johnson-Lindenstrauss theorem techniques to achieve data compression, which can facilitate time-series telemetry data compression according to aligned time series tensors, in accordance with an embodiment of this disclosure. In some examples, information from table 700 can be used by compression of telemetry sensor data with linear mappings component 108A of FIG. 1 or compression of telemetry sensor data with linear mappings component 108B to facilitate compression of telemetry sensor data with linear mappings.

Table 700 comprises a comparison of fold-compression achieved by the present techniques, using various JLT approaches to achieve data compression, to create 256-dimensional tensors versus original telemetry sensor data in CSV file format. In table 700, "M" indicates million, and "RP" indicates random projection.

Rows 702 indicate particular examples, and columns 704 indicates respective numbers of data points, compression techniques, and fold compression amounts for each example.

In an example, 1,200,000 to 100,000,000 rows of telemetry sensor data can be selected from a data set for a single sensor attribute, resulting in a range of approximately 8 hours to 21 days of data, respectively. The present techniques can be applied to the univariate telemetry sensor data to transform the tabular time series data into aligned tensors for $s \in M$, where $|M|=331$ and s=central processing unit (CPU) utilization. Then, various JLT techniques (k=256) can be applied to the aligned tensors to create M $\mathbb{R}^{256}$ representations of the sensor data for $m \in M$.

A comparison of the file sizes for the raw telemetry sensor data in CSV file format, versus the CSV file format data outputs created by the present techniques, can demonstrate a 100-to-3,000-fold data compression over the raw data, as shown in table 700. The amount of data compression achieved by applying the present techniques can be dependent on the range of the initial time series. A variety of JLT techniques can be implemented, including Sparse Random Projections, Very Sparse Random Projections, and FJLT. A sparsity of the 256-dimensional tensor representations of the full-size aligned tensors can have a subtle impact on the compression of the data, as shown in table 700.

FIG. 8 illustrates an example table showing fold-compression achieved by 256-dimensional tensors created according to the present techniques on a 100 million row univariate telemetry sensor data set versus raw tabular telemetry data, which can facilitate time-series telemetry data compression according to aligned time series tensors, in accordance with an embodiment of this disclosure. In some examples, information from table 800 can be used by compression of telemetry sensor data with linear mappings component 108A of FIG. 1 or compression of telemetry sensor data with linear mappings component 108B to facilitate compression of telemetry sensor data with linear mappings.

Table 800 comprises a comparison of fold-compression achieved by 256-dimensional tensors created by variations of the present techniques on a 100 million row univariate telemetry sensor data set versus a raw tabular telemetry data in CSV file format. In table 800, "RP" indicates random projection, and "NA" indicates not applicable in examples that prohibit tensors of more than 1,000 columns in CSV file format.

In table 800, rows 802 indicate particular examples, and columns 804 indicate corresponding methods used, output file format, and fold compression.

In an example, 100,000,000 rows of telemetry sensor data are selected from a data set for a single sensor attribute, resulting in 21 days of data. The file size of the telemetry sensor data in CSV file format can be compared to different file formats of the data generated by a JLT downsampling technique (k=256) to create M $\mathbb{R}^{256}$ representations of the sensor data for each $m \in M$, where $|M|=331$ and s=CPU utilization. The present techniques can demonstrate a 3,000-to-24,000-fold compression over the raw telemetry data in CSV file format, as shown in table 800. The JLT-compressed data created by the present techniques can be stored in CSV, NPY, and NPZ file formats. The amount of data compression achieved by applying the present techniques can be dependent on a range of the initial time series, a sparsity of the time series data, and a compressed data file format.

NPY and NPZ file formats can comprise dense and sparse array/tensor representations of data in NumPy, respectively. A NPZ file format can comprise a zipped archive of three NPY files containing: data, pointers, and indices. Application of the present techniques to the telemetry sensor data, and export of the output into either the NPY dense array or NPZ sparse array file formats, can demonstrate further compression over a CSV file format regardless of which compression approaches according to the present techniques is employed, as shown in table 800.

Use of the present techniques to create aligned tensors for s E M (e.g., a vectorization method in table 800), and comparison to JLT approaches can demonstrate that vectorization techniques can provide some data compression. Further, JLT approaches according to the present techniques can create substantial data compression relative to the raw telemetry data in CSV format. A Very Sparse Random Projection representation of the data in table 800 can provide an improved compression result for the NPZ sparse array file format over the NPY dense array file format. A FJLT can create a dense low-dimensional representation of the data, and so it can be that a NPZ file format of the FJLT compression method provides no compression over a NPY file format.

FIG. 9 illustrates an example table 900 showing fold-compression achieved by 256-dimensional tensors created with a fast Johnson-Lindenstrauss theorem on univariate telemetry sensor data set versus raw telemetry data in memory, which can facilitate time-series telemetry data compression according to aligned time series tensors, in accordance with an embodiment of this disclosure. In some examples, information from table 900 can be used by compression of telemetry sensor data with linear mappings component 108A of FIG. 1 or compression of telemetry sensor data with linear mappings component 108B to facilitate compression of telemetry sensor data with linear mappings.

Table 900 comprises a comparison of fold-compression achieved by the 256-dimensional tensors created by a FJLT according to the present techniques on univariate telemetry sensor data set versus raw telemetry data in memory.

In table 900, rows 902 indicate particular examples, and columns 904 indicate corresponding numbers of data points, object formats, and fold compression.

In an example, 1,200,000 to 100,000,000 rows of telemetry sensor data are selected from a data set for a single sensor attribute, resulting in a range of approximately 8 hours to 21 days of data, respectively. The file size in memory of the telemetry sensor data can be compared to different file formats of the data generated by FJLT downsampling method (k=256) to create M $R^{256}$ representations of the sensor data for each m E M, where $|M|=331$ and s=CPU utilization. The present techniques can demonstrate a 1,000-to-100,000,000-fold compression over the raw telemetry data in memory, in table 900.

The FJLT-downsampled data created by the present techniques can be held in a pandas dataframe, a NumPy dense array, and a compressed sparse row (CSR) array, among others. These file formats can demonstrate substantial improvements in data object memory consumption versus the raw data input, where in this example, the CSR array format provides the best improvement at a more than 300,000,000-fold improvement. The amount of data compression achieved by applying the present techniques can be dependent on the range of the initial time series, the sparsity of the time series data, and the compressed data memory object format.

FIG. 10 illustrates an example table 1000 showing fold-compression achieved by 256-dimensional tensors created with a fast Johnson-Lindenstrauss theorem on a 5 sensor×1 million rows per sensor multivariate telemetry data set versus raw tabular telemetry data, which can facilitate time-series telemetry data compression according to aligned time series tensors, in accordance with an embodiment of this disclosure. In some examples, information from table 1000 can be used by compression of telemetry sensor data with linear mappings component 108A of FIG. 1 or compression of telemetry sensor data with linear mappings component 108B to facilitate compression of telemetry sensor data with linear mappings.

Table 1000 comprises a comparison of fold-compression achieved by the 256-dimensional tensors created by a FJLT according to the present techniques on a 5 sensor×1 million rows per sensor multivariate telemetry data set versus raw tabular telemetry data in a CSV file format.

In table 1000, rows 1002 indicate particular examples, and columns 1004 indicate corresponding output file formats, and fold compression.

In an example, 5,000,000 rows of telemetry sensor data are selected from a data set for a five different sensor attributes (1 million rows of data per sensor attribute), resulting in approximately 8 hours of data. The present techniques can be applied to the multivariate telemetry sensor data to transform the tabular time series data into aligned tensors for $s_n \in M$, where $|M|=322$ and $n=\{0, 1, 2, 3, 4\}$. Then FJLT approaches (k=256) can be applied to the aligned tensors to create $M \in \mathbb{R}^{256}$ representations of the sensor data for $s_n \in M$ where $s_n=\{$CPU power, CPU utilization, fan power, memory power, memory usage$\}$.

A comparison of the file sizes for the raw telemetry sensor data in CSV file format versus the CSV file format data output created by the present techniques can demonstrate a 150-fold data compression over the raw data, in table 1000. The fold-compression results can be similar to those observed with univariate telemetry data compression studies (in table 700 if FIG. 7). The fold-compression can be further improved by storing the output data in either NPY or NPZ file format. These results can be like those observed with univariate telemetry data compression studies depicted in table 1000 of FIG. 10. These results can further demonstrate an ability of the present techniques to compress univariate and multivariate telemetry sensor data.

Figure 11:
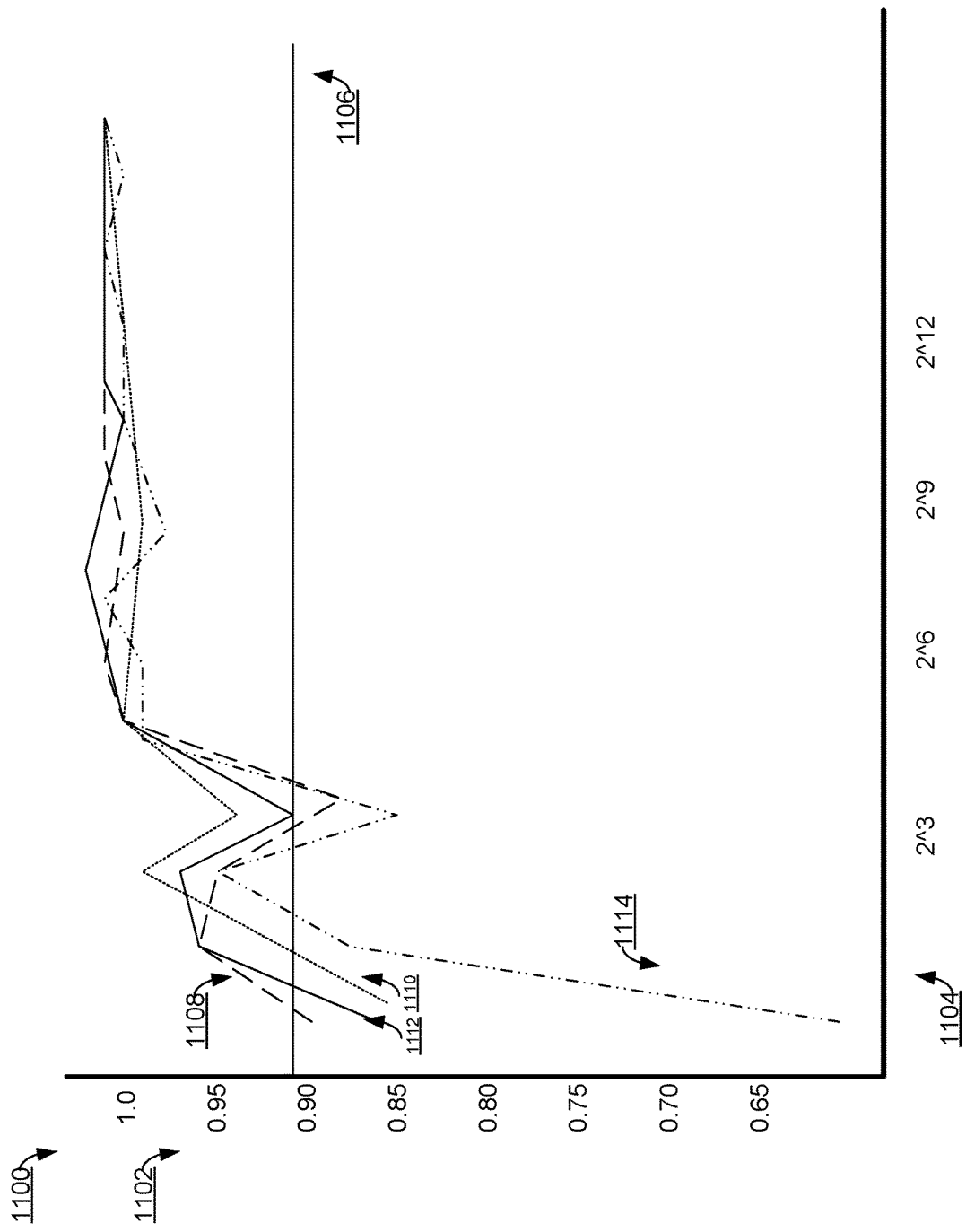
FIG. 11 illustrates an example graph that plots k-dimensions of data versus clustering scores of various clustering metrics, which can facilitate time-series telemetry data compression according to aligned time series tensors, in accordance with an embodiment of this disclosure.

FIG. 11 illustrates an example graph 1100 that plots k-dimensions of data versus clustering scores of various clustering metrics, which can facilitate time-series telemetry data compression according to aligned time series tensors, in accordance with an embodiment of this disclosure. In some examples, information from graph 1100 can be used by compression of telemetry sensor data with linear mappings component 108A of FIG. 1 or compression of telemetry sensor data with linear mappings component 108B to facilitate compression of telemetry sensor data with linear mappings.

Graph 1100 comprises a plot of k-dimensions 1102 of the data versus clustering scores 1104 of various clustering metrics from an application of the present techniques and DBSCAN clustering of resulting tensors. The 90% clustering metric value threshold is shown for reference (1106). In the example of graph 1100, the 90% clustering metric value threshold is exceeded for all clustering metrics when k≥32 (that is, 25).

Plotted are homogeneity 1108, completeness 1110, validity measure 1112, and adjusted Rand index 1114.

In an example, 100,000,000 rows of telemetry sensor data are selected for a single sensor attribute; approximately 21 days of data. The present techniques can be applied to the univariate telemetry sensor data. The present techniques can reduce the tabular time series data into aligned tensors for $s \in M$, where $|M|=331$, s=CPU utilization, and each aligned tensor is of dimensions $w \in \mathbb{R}^{368640}$. The aligned tensors can then be broken into 20 equal sections of $\mathbb{R}^{18432}$ for each $m \in M$; approximately 16 hours of data per tensor $w_i \in \mathbb{R}^{18432}$, where $$w \in \mathbb{R}^{368640} = \Sigma_{i=0}^{20} w_i \in \mathbb{R}^{18432} \quad (11)$$

for each $m \in M$. A FJLT approach can then be applied to each $w_i \in \mathbb{R}^{18432}$, $\forall m \in M$, over $2^\rho$ different k values s.t. k≤ξ, where ξ and max(φ are defined by Equation 7, k∈ $\{2^\rho, \ldots, \xi\}$, and $\rho = \{1, \ldots, \max(\rho)\}$. The length of the ρ values set can be defined as $\Xi=|\rho|$. This can lead to $\Xi$ $\mathbb{R}^k$ representations of each $w_i \in w$, $\forall m \in M$. The $w_i \times \Xi$ $\mathbb{R}^k$ representations of the data can then be concatenated into tensors for each discrete k value such that $$w_c = \Sigma_{i=0}^{20} w_i \in \mathbb{R}^k, \forall k \in \Xi \quad (12)$$

to provide a group of concatenated row tensors $w_c \in \mathbb{R}^{(20 \times k)}$ for each $k \in \Xi$, where each $w_c$ is a low-dimensional representation of w for each $m \in M$, and $|w_c| < |w|, \forall w \in M$.

To assess the ability of the present techniques to facilitate data science applications on the lower-dimensional and compressed data, $M \in \mathbb{R}^{(20 \times k)}$ tensors can be used in a data science clustering analysis. A DBSCAN clustering techniques can be independently applied to each (20×k)-dimensional telemetry sensor data set created with the present techniques, as well as the original full-size (i.e. d=368, 640) telemetry data set.

A quality of the DBSCAN clustering results can be evaluated using a variety of clustering metrics including Homogeneity, Completeness, Validity Measure, and Adjusted Rand Index. For clustering metrics, scores of 1 can indicate identical cluster composition to ground-truth. Clusters created from the original full-size (that is, d-dimensional) telemetry data set can be treated as the ground-truth for clustering metric assessment purposes.

An outcome of this analysis can demonstrate that the telemetry data processed by the present techniques results in nearly identical clustering outcomes as the raw telemetry data for k≥32 (e.g., in graph 500 of FIG. 5). Further, these findings can demonstrate an additive homomorphic property of the present techniques.

The additive homomorphism of the present techniques can allow for high-frequency telemetry sensor data to be collected at regular intervals. The collected data can be subjected to the present techniques then additively combined after transmission, or receipt of the data at a data center, to achieve nearly identical data science outcomes as achieved with raw telemetry data.

The present techniques can facilitate an efficient approach for the compression of telemetry sensor data. The application of the present techniques can reduce a dimensionality of telemetry sensor data by ≥99% while preserving pair-wise distances between aligned telemetry data tensors. In some examples, the present techniques can achieve a more than 20,000-fold compression of the data versus the raw telemetry sensor data set. Further, lower-dimensional tensors, when used in machine learning algorithms such as clustering analyses, can provide comparable results with full-length tensors. The present techniques can demonstrate superior results over randomly downsampled tensors of similar low-dimensionality.

The present techniques can comprise additive homomorphism, which can facilitate high-frequency telemetry sensor data collection at regular intervals. Collected data can be subjected to the present techniques then additively combined after transmission, or receipt of the data at a data center, to achieve nearly identical data science outcomes as achieved with raw telemetry data. These algebra homomorphisms can also be the basis of homomorphic encryption, with advantageous applications in privacy-preserving data transmission, storage, and computation.

Example Process Flows

FIG. 12 illustrates an example process flow 1200 for compression of telemetry sensor data with linear mappings, in accordance with an embodiment of this disclosure. In some examples, one or more embodiments of process flow 1200 can be implemented by system architecture 100 of FIG. 1 (e.g., with compression of telemetry sensor data with linear mappings component 108A, compression of telemetry sensor data with linear mappings component 108B, and/or data science component 110), or computing environment 1500 of FIG. 15.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 1300 of FIG. 13, and/or process flow 1400 of FIG. 14.

Process flow 1200 begins with 1202, and moves to operation 1204. Operation 1204 depicts identifying a group of time-series telemetry data that represents performance metrics of computing devices, wherein the group of time-series telemetry data is represented according to a first number of dimensions. This can comprise time-series telemetry data for computer 102A of FIG. 1 or computer 102B, and can be identified by compression of telemetry sensor data with linear mappings component 108A or compression of telemetry sensor data with linear mappings component 108B, respectively.

After operation 1204, process flow 1200 moves to operation 1206.

Operation 1206 depicts compressing the group of time-series telemetry data to produce a compressed group of time-series telemetry data, wherein the compressed group of time-series telemetry data is represented according to a second number of dimensions that is less than the first number of dimensions, wherein the compressed group of time-series telemetry data is homomorphic relative to the group of time-series telemetry data, and wherein a first data size of the compressed group of time-series telemetry data is smaller than a second data size of the group of time-series telemetry data. This can comprise a homomorphic compression, such as depicted in FIG. 2.

In some examples, the group of time-series telemetry data comprises values, and wherein the values are omitted from the compressed group of time-series telemetry data. That is, it can be that as a result of homomorphic compression, none of the original values of the data are present in the compressed data.

In some examples, operation 1206 comprises encrypting the group of time-series telemetry data. That is, homomorphic compression of data can include encrypting the data.

In some examples, operation 1206 comprises receiving user data that is indicative of user selection of a degree of dimensionality reduction, and wherein compressing the group of time-series telemetry data to produce the compressed group of time-series telemetry data comprises compressing the group of time-series telemetry data according to the degree of dimensionality reduction. That is a user can define a degree of dimensionality reduction (e.g., reducing the dimensions from d dimensions to k dimensions).

In some examples, operation 1206 comprises receiving user data that is indicative of user selection of an integrity of an algebraic homomorphism, and wherein compressing the group of time-series telemetry data to produce the compressed group of time-series telemetry data comprises compressing the group of time-series telemetry data according to the integrity of the algebraic homomorphism. That is, a user can control the integrity of the algebraic homomorphism (e.g., e, error).

In some examples, operation 1206 comprises compressing the group of time-series telemetry data according to a Johnson-Lindenstrauss lemma to a linear mapping.

After operation 1206, process flow 1200 moves to operation 1208.

Operation 1208 depicts performing a data science operation on the compressed group of time-series telemetry data to produce a first result, wherein the first result is within a predetermined threshold value of a second result of performing the data science operation on the group of time-series telemetry data. This can comprise server 104 of FIG. 1 receiving the compressed group of time-series telemetry data, and data science component 110 performing a data science operation on the data. This data science operation, for example, can comprise performing clustering analysis on compressed data received from multiple computers (e.g., including computer 102A and computer 102B) to identify a computer that is exhibiting anomalous behavior.

In some examples, the group of time-series telemetry data is a first group of time-series telemetry data, the compressed group of time-series telemetry data is a first compressed group of time-series telemetry data, and the data science operation is a first data science operation. In such examples, operation 1208 can comprise compressing a second group of time-series telemetry data to produce a second compressed group of time-series telemetry data, wherein the second compressed group of time-series telemetry data is homomorphic relative to the second group of time-series telemetry data; combining the first compressed group of time-series telemetry data and the second compressed group of time-series telemetry data independent of decompressing the first compressed group of time-series telemetry data and the second compressed group of time-series telemetry data to produce a third compressed group of time-series telemetry data; and performing a second data science operation on the third compressed group of time-series telemetry data to produce a third result. That is, the compressed group of time-series telemetry data can have a property of additive homomorphism, where it can be combined with additionally homomorphically-compressed data in the data's compressed state.

After operation 1208, process flow 1200 moves to 1210, where process flow 1200 ends.

FIG. 13 illustrates another example process 1300 flow for compression of telemetry sensor data with linear mappings, in accordance with an embodiment of this disclosure. In some examples, one or more embodiments of process flow 1300 can be implemented by system architecture 100 of FIG. 1 (e.g., with compression of telemetry sensor data with linear mappings component 108A, compression of telemetry sensor data with linear mappings component 108B, and/or data science component 110), or computing environment 1500 of FIG. 15.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of one or more of process flow 1200 of FIG. 12, and/or process flow 1400 of FIG. 14.

Process flow 1300 begins with 1302, and moves to operation 1304. Operation 1304 depicts identifying a group of time-series telemetry data that represents performance metrics of computing devices. In some examples, operation 1304 can be implemented in a similar manner as operation 1204 of FIG. 12.

In some examples, the group of time-series telemetry data comprises univariate time-series values. In some examples, the group of time-series telemetry data comprises a tensor.

After operation 1304, process flow 1300 moves to operation 1306.

Operation 1306 depicts compressing the group of time-series telemetry data to produce a compressed group of time-series telemetry data, wherein the compressed group of time-series telemetry data is of a second number of dimensions that is less than a first number of dimensions of the group of time-series telemetry data, and wherein the compressed group of time-series telemetry data is homomorphic relative to the group of time-series telemetry data. In some examples, operation 1306 can be implemented in a similar manner as operation 1206 of FIG. 12.

In some examples, operation 1306 comprises performing lossy compression on the group of time-series telemetry data. That is, the homomorphic compression can comprise a lossy compression where some of the original data cannot be recreated from the compressed data (compared to a lossless compression where a complete reproduction of the original data can be recreated from the compressed data).

After operation 1306, process flow 1300 moves to operation 1308.

Operation 1308 depicts performing a data science operation on the compressed group of time-series telemetry data to produce a first result, wherein the first result is within a predetermined threshold value of a second result of performing the data science operation on the group of time-series telemetry data. In some examples, operation 1308 can be implemented in a similar manner as operation 1208 of FIG. 12.

In some examples, operation 1308 comprises facilitating transmitting the compressed group of time-series telemetry data to a remote device via communications network, wherein the remote device performs the performing of the data science operation on the compressed group of time-series telemetry data to produce the first result. That is, compression of telemetry sensor data with linear mappings component 108A of FIG. 1 can gather the data for computer 102A and compress it, and then transmit the compressed data to server 104, where data science component 110 can perform data science operations on it.

In some examples, the data science operation comprises a data clustering operation, a data classification operation, or a data similarity analysis operation.

In some examples, performing the data science operation can comprise performing anomaly detection for a computing device of the computing devices based on the first result. That is, the data science operation can be performed to determine whether computer 102A of FIG. 1 is behaving anomalously.

After operation 1308, process flow 1300 moves to 1310, where process flow 1300 ends.

FIG. 14 illustrates another example process flow 1400 for compression of telemetry sensor data with linear mappings, in accordance with an embodiment of this disclosure. In some examples, one or more embodiments of process flow 1400 can be implemented by system architecture 100 of FIG. 1 (e.g., with compression of telemetry sensor data with linear mappings component 108A, compression of telemetry sensor data with linear mappings component 108B, and/or data science component 110), or computing environment 1500 of FIG. 15.

It can be appreciated that the operating procedures of process flow 1400 are example operating procedures, and that there can be embodiments that implement more or fewer operating procedures than are depicted, or that implement the depicted operating procedures in a different order than as depicted. In some examples, process flow 1400 can be implemented in conjunction with one or more embodiments of one or more of process flow 1200 of FIG. 12, and/or process flow 1300 of FIG. 13.

Process flow 1400 begins with 1402, and moves to operation 1404. Operation 1404 depicts compressing a group of time-series telemetry data, the compressing resulting in a compressed group of time-series telemetry data, wherein the group of time-series telemetry data represents performance metrics of computing devices, wherein the compressed group of time-series telemetry data has a second number of dimensions that is less than a first number of dimensions of the group of time-series telemetry data, and wherein the compressed group of time-series telemetry data is homomorphic relative to the group of time-series telemetry data. In some examples, operation 1404 can be implemented in a similar manner as operations 1204-1206 of FIG. 12.

In some examples, the compressed group of time-series telemetry data comprises telemetry tensors stored in a comma separated values format. In some examples, the compressed group of time-series telemetry data comprises telemetry tensors stored in a two-dimensional array format. The two-dimensional array format can comprise a NumPy format.

In some examples, compressing the group of time-series telemetry data to produce the compressed group of time-series telemetry data is based on creating a matrix from a random normal distribution that is based on a random seed. That is, a homomorphic encryption and compression can be based on a random seed for a random normal distribution from which a matrix A is created.

In some examples, operation 1404 comprises compressing the group of time-series telemetry data according to a degree of dimensionality reduction identified in user data received via user input, the degree of dimensionality reduction being applicable to reduce a degree of dimensionality of the first number of dimensions. That is, a user can define a degree of dimensionality reduction (e.g., d-to-k dimensions, where the user defines k).

After operation 1404, process flow 1400 moves to operation 1406.

Operation 1406 depicts performing a data science operation on the compressed group of time-series telemetry data to produce a first result, wherein the first result is within a predetermined threshold value of a second result of performing the data science operation on the group of time-series telemetry data. In some examples, operation 1406 can be implemented in a similar manner as operation 1208 of FIG. 12.

In some examples, the compressed group of time-series telemetry data is a first compressed group of time-series telemetry data. In such examples, operation 1406 can comprise combining the first compressed group of time-series telemetry data with a second compressed group of time-series telemetry data. That is, the compressed data can have a property of additive homomorphism.

After operation 1406, process flow 1400 moves to 1408, where process flow 1400 ends.

Example Operating Environment

In order to provide additional context for various embodiments described herein, FIG. 15 and the following discussion are intended to provide a brief, general description of a suitable computing environment 1500 in which the various embodiments of the embodiment described herein can be implemented.

For example, parts of computing environment 1500 can be used to implement one or more embodiments of computer 102A, computer 102B, or server 104 of FIG. 1.

In some examples, computing environment 1500 can implement one or more embodiments of the process flows of FIGS. 12-14 to facilitate compression of telemetry sensor data with linear mappings.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a nonvolatile storage such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are examples and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   determining to compress a group of time-series telemetry data that represents performance metrics of computing devices into a compressed group of time-series telemetry time series data,
      wherein the compressed group of time-series telemetry time series data is usable for data science operations that evaluate performance of the computing devices,
      wherein from which results satisfy a similarity criterion relative to a performance of corresponding data science operations on the group of time-series telemetry data, and
      wherein the group of time-series telemetry data is represented according to a first number of values;
   compressing the group of time-series telemetry data to produce the compressed group of time-series telemetry data,
      wherein the compressed group of time-series telemetry data is represented according to a second number of values that is less than the first number of values,
      wherein the compressed group of time-series telemetry data is homomorphic relative to the group of time-series telemetry data, and
      wherein a first data size of the compressed group of time-series telemetry data is smaller than a second data size of the group of time-series telemetry data; and
   performing a data science operation that evaluates performance of the computing devices on the compressed group of time-series telemetry data to produce a first result, wherein the first result is within a predetermined threshold value of a second result of performing the data science operation on the group of time-series telemetry data.

2. The system of claim 1, wherein the group of time-series telemetry data is a first group of time-series telemetry data, wherein the compressed group of time-series telemetry data is a first compressed group of time-series telemetry data, wherein the data science operation is a first data science operation, and wherein the operations further comprise:
   compressing a second group of time-series telemetry data to produce a second compressed group of time-series telemetry data, wherein the second compressed group of time-series telemetry data is homomorphic relative to the second group of time-series telemetry data;
   combining the first compressed group of time-series telemetry data and the second compressed group of time-series telemetry data independent of decompressing the first compressed group of time-series telemetry data and the second compressed group of time-series telemetry data to produce a third compressed group of time-series telemetry data; and
   performing a second data science operation on the third compressed group of time-series telemetry data to produce a third result.

3. The system of claim 1, wherein the group of time-series telemetry data comprises values, and wherein the values are omitted from the compressed group of time-series telemetry data.

4. The system of claim 1, wherein compressing the group of time-series telemetry data to produce the compressed group of time-series telemetry data comprises:
   encrypting the group of time-series telemetry data.

5. The system of claim 1, wherein the operations further comprise:
   receiving user data that is indicative of user selection of an amount of reduction of the first number of values, and
   wherein compressing the group of time-series telemetry data to produce the compressed group of time-series telemetry data comprises compressing the group of time-series telemetry data according to the amount of reduction of the first number of values.

6. The system of claim 1, wherein the operations further comprise:
   receiving user data that is indicative of user selection of an integrity of an algebraic homomorphism, and
   wherein compressing the group of time-series telemetry data to produce the compressed group of time-series telemetry data comprises compressing the group of time-series telemetry data according to the integrity of the algebraic homomorphism.

7. The system of claim 1, wherein compressing the group of time-series telemetry data to produce the compressed group of time-series telemetry data comprises compressing the group of time-series telemetry data according to a Johnson-Lindenstrauss lemma to a linear mapping.

8. A method, comprising:
   determining to compress, by a system comprising a processor, a group of time-series telemetry data that represents performance metrics of computing devices into a compressed group of time-series telemetry time series data;

compressing, by the system, the group of time-series telemetry data to produce the compressed group of time-series telemetry data, wherein the compressed group of time-series telemetry data is of a second number of values that is less than a first number of values of the group of time-series telemetry data, and wherein the compressed group of time-series telemetry data is homomorphic relative to the group of time-series telemetry data; and performing, by the system, a data science operation that evaluates performance of the computing devices on the compressed group of time-series telemetry data to produce a first result, wherein the first result is within a predetermined threshold value of a second result of performing the data science operation on the group of time-series telemetry data.

9. The method of claim 8, further comprising:

facilitating, by the system, transmitting the compressed group of time-series telemetry data to a remote device via communications network, wherein the remote device performs the performing of the data science operation on the compressed group of time-series telemetry data to produce the first result.

10. The method of claim 8, wherein the group of time-series telemetry data comprises univariate time-series values.

11. The method of claim 8, wherein the group of time-series telemetry data comprises a tensor.

12. The method of claim 8, wherein compressing the group of time-series telemetry data to produce the compressed group of time-series telemetry data comprises:

performing lossy compression on the group of time-series telemetry data.

13. The method of claim 8, wherein the data science operation comprises a data clustering operation, a data classification operation, or a data similarity analysis operation.

14. The method of claim 8, further comprising:

performing, by the system, anomaly detection for a computing device of the computing devices based on the first result.

15. A non-transitory computer-readable medium comprising instructions that, in response to execution, cause a system comprising a processor to perform operations, comprising:

compressing a group of time-series telemetry data into a compressed group of time-series telemetry data, wherein the group of time-series telemetry data represents performance metrics of computing devices, wherein the compressed group of time-series telemetry data has a second number of values that is less than a first number of values of the group of time-series telemetry data, and wherein the compressed group of time-series telemetry data is homomorphic relative to the group of time-series telemetry data; and performing a data science operation that evaluates performance of the computing devices on the compressed group of time-series telemetry data to produce a first result, wherein the first result is within a predetermined threshold value of a second result of performing the data science operation on the group of time-series telemetry data.

16. The non-transitory computer-readable medium of claim 15, wherein the compressed group of time-series telemetry data comprises telemetry tensors stored in a comma separated values format.

17. The non-transitory computer-readable medium of claim 15, wherein the compressed group of time-series telemetry data comprises telemetry tensors stored in a two-dimensional array format.

18. The non-transitory computer-readable medium of claim 15, wherein compressing the group of time-series telemetry data to produce the compressed group of time-series telemetry data is based on creating a matrix from a random normal distribution that is based on a random seed.

19. The non-transitory computer-readable medium of claim 15, wherein the compressed group of time-series telemetry data is a first compressed group of time-series telemetry data, and wherein the operations further comprise:

combining the first compressed group of time-series telemetry data with a second compressed group of time-series telemetry data.

20. The non-transitory computer-readable medium of claim 15, wherein compressing the group of time-series telemetry data to produce the compressed group of time-series telemetry data comprises compressing the group of time-series telemetry data according to an amount of reduction of the first number of values identified in user data received via user input, the degree of dimensionality reduction being applicable to reduce an amount of the first number of values.

\* \* \* \* \*